US012517809B1

(12) United States Patent
Hu et al.

(10) Patent No.: US 12,517,809 B1
(45) Date of Patent: Jan. 6, 2026

(54) ADJUSTING SATISFIABILITY MODULO THEORIES SOLVER CONFIGURATIONS

(71) Applicant: Amazon Technologies, Inc., Seattle, WA (US)

(72) Inventors: Yang Hu, Austin, TX (US); Dejan Jovanovic, Brooklyn, NY (US); Amit Goel, Portland, OR (US); Neha Rungta, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 334 days.

(21) Appl. No.: 17/937,263

(22) Filed: Sep. 30, 2022

(51) Int. Cl.
*G06F 11/3668* (2025.01)

(52) U.S. Cl.
CPC ...... *G06F 11/3684* (2013.01); *G06F 11/3688* (2013.01)

(58) Field of Classification Search
CPC .......................... G06F 11/3684; G06F 11/3688
See application file for complete search history.

(56) References Cited

U.S. PATENT DOCUMENTS

| 2020/0073739 | A1* | 3/2020 | Rungta | G06F 8/60 |
|---|---|---|---|---|
| 2020/0193323 | A1* | 6/2020 | Alesiani | G06N 20/00 |
| 2020/0210832 | A1* | 7/2020 | Driscoll | G06N 3/063 |
| 2021/0058345 | A1* | 2/2021 | Yoon | H04L 51/02 |
| 2021/0096832 | A1* | 4/2021 | Rich | G06F 40/154 |
| 2021/0150139 | A1* | 5/2021 | Stafford | G06F 40/18 |
| 2021/0240453 | A1* | 8/2021 | Badlani | G06F 8/42 |
| 2022/0137959 | A1* | 5/2022 | Neves | G06F 8/75 717/132 |
| 2022/0222047 | A1* | 7/2022 | Todirel | G06F 9/453 |
| 2023/0376558 | A1* | 11/2023 | Seyfi | G06N 3/045 |

OTHER PUBLICATIONS

Hůla, Jan, David Mojžíšek, and MikolášJanota. "Graph neural networks for scheduling of SMT solvers." 2021 IEEE 33rd International Conference on Tools with Artificial Intelligence (ICTAI). IEEE, 2021. (Year: 2021).*
Leventi-Peetz, Anastasia-Maria, Jörg-Volker Peetz, and Martina Rohde. "ML Supported Predictions for SAT Solvers Performance." Proceedings of the Future Technologies Conference (FTC) 2019: vol. 1. Springer International Publishing, 2020. (Year: 2020).*
Wang, Yu, et al. "CNNSAT: Fast, Accurate Boolean Satisfiability using Convolutional Neural Networks." (2018). (Year: 2018).*
(Continued)

Primary Examiner — Bradley A Teets
Assistant Examiner — Joanne G Macasiano
(74) Attorney, Agent, or Firm — Athorus, PLLC

(57) ABSTRACT

Disclosed are systems and methods for adjusting the encoding/ordering of parts of a satisfiability modulo theories ("SMT") problem indicated in an SMT configuration and/or optimizing the SMT solver configuration of an SMT solver to reduce the processing time needed to process the SMT problem using the SMT solver. For example, the order of parts of an SMT problem may be rearranged to reduce a processing time of the SMT problem. Likewise, the configuration options selected for an SMT solver may be adjusted to reduce the processing time required to process an SMT problem.

20 Claims, 14 Drawing Sheets

(56) References Cited

OTHER PUBLICATIONS

Gálvez Ramírez, Nicolás, et al. "Towards automated strategies in satisfiability modulo theory." European Conference on Genetic Programming. Cham: Springer International Publishing, 2016. (Year: 2016).*

Balunovic, M., Bielik, P., & Vechev, M. (2018). Learning to Solve SMT Formulas. Advances in Neural Information Processing Systems, 31. (Year: 2018).

Barrett, C., Stump, A, & Tinelli, C. (Jul. 2010). The SMT-LIB Standard: Version 2.0 (Version 2.6). In Proceedings of the 8th International Workshop on Satisfiability Modulo Theories (Edinburgh, UK) (vol. 13, p. 14). Copyright © 2015-21 (Year: 2010).

Selsam, D., & Bjørner, N. (Jun. 2019). Guiding High-Performance SAT Solvers with Unsat-Core Predictions. In International Conference on Theory and Applications of Satisfiability Testing (pp. 336-353). Cham: Springer International Publishing. (Year: 2019).

\* cited by examiner

ADJUSTING SATISFIABILITY MODULO THEORIES SOLVER CONFIGURATIONS

BACKGROUND

Satisfiability modulo theories ("SMT") problem and SMT solvers are widely used in a variety of domains including software testing, software verification, automated theorem proving, program analysis, etc. Users typically encode their problems in the standard SMT language. Changing the encoding or ordering of parts of an SMT problem can have a dramatic impact on the performance of an SMT solver that processes the SMT problem. An example encoding transformation is to reorder some parts of the SMT problem (e.g., assertions and terms). However, the optimal ordering of the assertions and/or terms of an SMT problem cannot be determined due to the complexity and difference of different SMT solvers, the interrelationships between assertions, terms, and/or the SMT solver utilized, etc.

In addition to the encoding or ordering of parts of an SMT problem, modern SMT solvers provide options that the user can utilize in an effort to boost the solving efficiency of SMT problems. However, manually configuring SMT solvers requires extensive expert knowledge which users often do not have and is often impossible for a human to resolve, especially with large SMT problems.

DETAILED DESCRIPTION

Figure 1A:
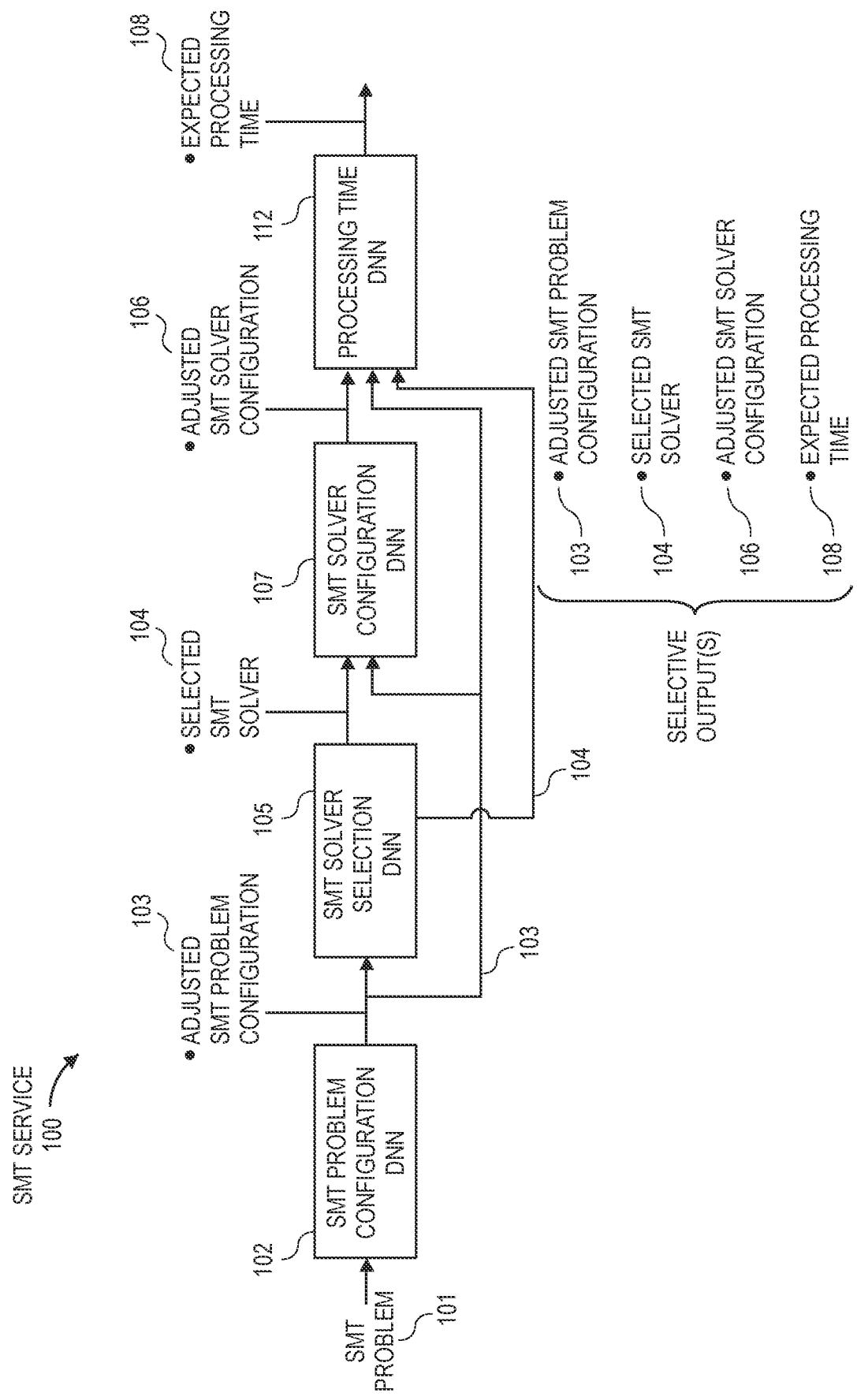
FIG. 1A is an illustration of an example satisfiability modulo theories ("SMT") service that generates adjusted SMT problems and/or adjusted SMT solvers, in accordance with disclosed implementations.

Disclosed are systems and methods for adjusting the encoding/ordering of parts of an SMT problem indicated in an SMT problem configuration and/or adjusting the SMT solver configuration of an SMT solver. For ease of explanation, the implementations discussed herein describe adjusting the SMT problem configuration, selecting an SMT solver, and/or adjusting the SMT solver configuration to reduce the processing time needed to process the SMT problem using the SMT solver. For example, the order of parts of an SMT problem may have an impact on processing time required to process the SMT problem with an SMT solver. Likewise, the configuration options selected for an SMT solver may likewise have an impact on the processing time required by the SMT solver to process the SMT problem.

It will be appreciated that the explanations and implementations provided herein for adjusting the SMT problem, selecting an SMT solver, and/or adjusting the SMT solver to reduce processing time is provided for explanation purposes only. The disclosed implementations are equally applicable to adjusting SMT problems, selecting SMT solvers, and/or adjusting SMT solvers to alter other aspects such as, but not limited to, memory usage, computing requirements, energy usage, etc. For example, the disclosed implementations may be utilized to adjust an SMT problem, select an SMT solver, and/or adjust an SMT solver configuration to reduce energy usage required to process the SMT problem using an SMT solver, rather than or in addition to adjusting to reduce processing time.

As is known, SMT problems may be used in a variety of domains including, but not limited to, software testing, software verification, automated theorem proving, program analysis, security analysis, etc. Likewise, there are multiple different SMT solvers that may be selected and configured to process SMT problems. Example SMT solvers include, but are not limited to ABsolver, CVC5, STP, veriT, Z3, etc. For example, SMT problems and SMT solvers are often used for verification of computer programs, to translate preconditions, postconditions, loops, assertions, terms, etc., into SMT problems to determine if all properties of the computer program can hold. SMT problems and SMT solvers are also often used to find security vulnerabilities.

As discussed further below, in some implementations, a deep neural network ("DNN"), such as a graph neural network ("GNN"), recurrent neural network ("RNN"), convolutional neural network ("CNN"), etc., may be trained to receive, as an input, a representation of an SMT problem and provide, as an output, an ordering of the parts of the SMT problem that will result in a shortest processing time by an SMT solver when processing the SMT problem. For example, a trained GNN may receive a node graph of an SMT problem (SMT problem representation), in which nodes of the graph represent parts of the SMT problem, such as assertions or terms. The trained GNN, upon receiving the node graph, may process the node graph and provide an ordering of the parts of the SMT problem that, if processed by an SMT solver according to the ordering, will result in a shortest processing time by the SMT solver. In some implementations, the output ordering may be a list ordering of the parts of the SMT problem. In other implementations, the output may be an adjusted node graph indicating the ordering of the nodes (parts) determined by the GNN. In still other examples, the output from the GNN may be a feature vector or other representation of the SMT problem with the determined ordering.

In other examples, a representation of an SMT problem may be provided to the same or a different DNN, such as a second GNN, and the second GNN, upon receiving the representation of the SMT problem, may process the representation and provide an expected processing time that will be required by the SMT solver to process the SMT problem with the ordering of parts indicated by the representation.

In addition to, or as an alternative to determining an ordering for parts of an SMT problem, in some implementations, the SMT problem, or an SMT problem representation of an SMT problem, may be processed by another DNN to determine an SMT solver of a plurality of SMT solvers to use for processing the SMT problem and/or determine SMT solver configuration options to select for an SMT solver. For example, a DNN may be trained to receive, as an input, an SMT problem representation of an SMT problem, such as a vector representation of an SMT problem, and provide, as an output, an indication of a particular SMT solver (e.g., ABsolver, CVC5, STP, veriT, Z3, etc.) that will process the SMT problem in the shortest amount of time. Alternatively, or in addition thereto, the same or different DNN may also be trained to receive the SMT problem representation and output an SMT configuration for configuring options of the SMT solver that will result in a shortest processing time by the SMT solver when processing the SMT problem.

FIG. 1A is an illustration of an example SMT service 100 that determines a configuration of an SMT problem that will result in a shortest processing time (adjusted SMT problem configuration), determines an SMT solver for processing an SMT problem in the shortest processing time, determines an SMT solver configuration for an SMT solver when processing an SMT problem (adjusted SMT solver configuration), and/or determines an expected processing time for processing an SMT problem when using an SMT solver. While the example SMT service 100 is illustrated sequentially with the SMT configuration DNN 102 receiving an SMT problem 101, outputting an adjusted SMT problem configuration 103 that is received by the SMT solver selection DNN 105 that selects an SMT solver 104, the SMT solver configuration DNN 107 receiving the indication of the selected SMT solver 104 and the adjusted SMT problem configuration 103 and outputting an adjusted SMT solver configuration 106, and the processing time DNN 112 receiving each of the adjusted SMT problem configuration 103, the indication of the selected SMT solver 104, and the adjusted SMT solver configuration 106, and outputting an overall expected processing time 108, in other implementations, some or all of the DNNs may be separate. For example, the SMT problem configuration DNN 102 may receive the SMT problem 101 and output the adjusted SMT problem configuration 103. However, rather than providing the adjusted SMT problem configuration to the SMT solver selection DNN 105, the adjusted SMT problem configuration 103 may be provided to the SMT solver configuration DNN 107, which may be trained for a specific SMT solver, and the SMT solver configuration DNN 107, based on the received input, may generate an adjusted SMT solver configuration 106 for the SMT solver for which it is already trained. As still another example, the SMT solver selection DNN 105 and/or the SMT solver configuration DNN 107 may receive, as input, the SMT problem 101, rather than receiving the adjusted SMT problem configuration 103.

Accordingly, the DNNs 102, 105, 107, 112 need not be processed serially as illustrated and may be processed in parallel or independent of one another. Likewise, in some implementations, some or all components of the SMT service 100 may be provided as a service to one or more entities, such as third parties, that may select to determine expected processing times, adjusted SMT problem configurations, adjusted SMT solvers to utilize with an SMT problem, an adjusted SMT solver configuration for processing an SMT problem, and/or any combination thereof.

Figure 1B:
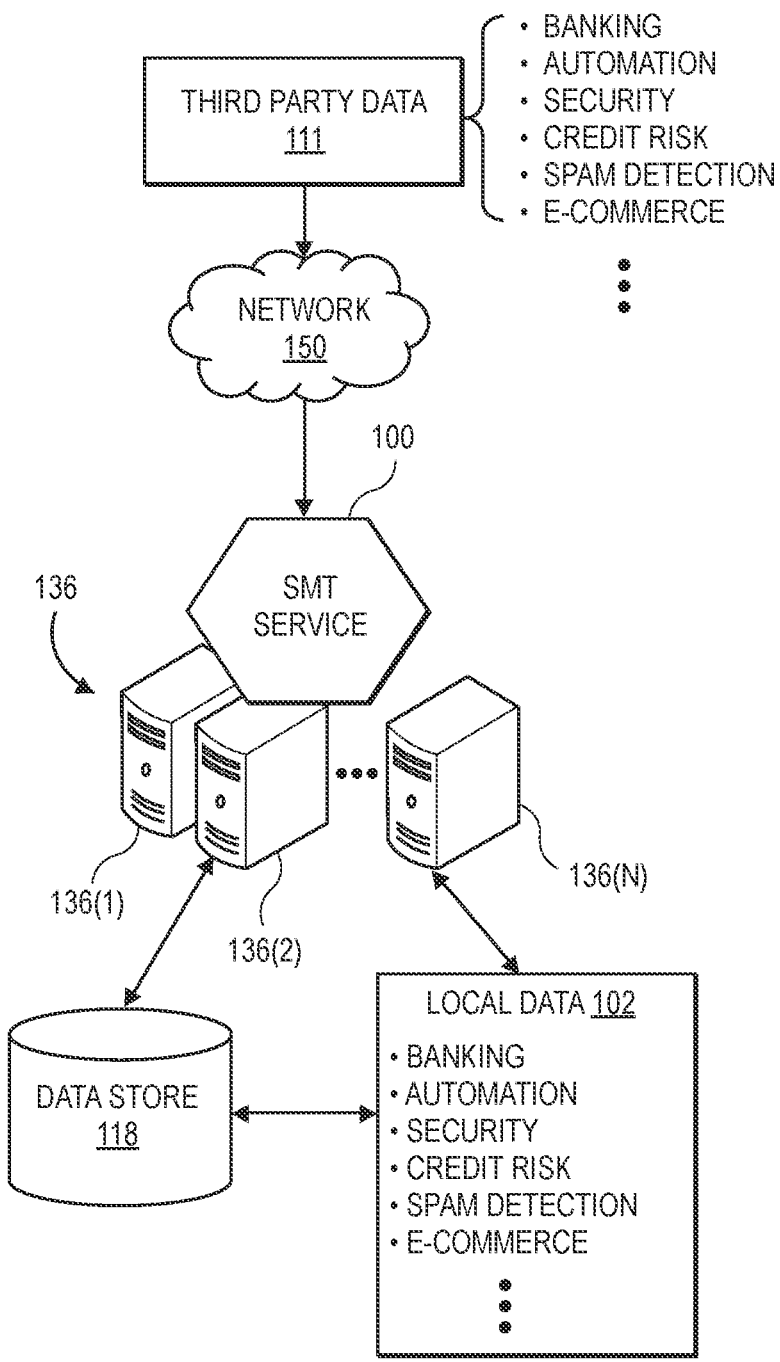
FIG. 1B is an illustration of the SMT service in an environment, in accordance with disclosed implementations.

For example, FIG. 1B illustrates an example SMT service 100 in an environment that includes a network configuration and one or more trained DNNs as part of the SMT service 100, in accordance with disclosed implementations.

As illustrated, the computing resource(s) 136 may be implemented as one or more servers 136(1), 136(2), . . . , 136(N) and may, in some instances, form a portion of a network-accessible computing platform implemented as a computing infrastructure of processors, storage, software, data access, and so forth that is maintained and accessible by other components/devices/systems via a network 150, such as an intranet (e.g., local area network), the Internet, etc.

The remote computing resource(s) 136, and each of the other computing resources discussed herein, do not require end-user knowledge of the physical premises and configuration of the system that delivers the services. Common expressions associated with these remote computing resource(s) 136 include "on-demand computing," "software as a service (Saas)," "platform computing," "network-accessible platform," "cloud services," "data centers," and so forth. Example components of a server that may be or be included in computing resources 136 is discussed below with respect to FIG. 12.

The network 150, and each of the other networks discussed herein, may utilize wired technologies (e.g., wires, USB, fiber optic cable, etc.), wireless technologies (e.g., radio frequency, infrared, NFC, cellular, satellite, Bluetooth, etc.), or other connection technologies. The network 150 is representative of any type of communication network, including data and/or voice network, and may be implemented using wired infrastructure (e.g., cable, CAT6, fiber optic cable, etc.), a wireless infrastructure (e.g., radio frequency, cellular, microwave, satellite, Bluetooth, etc.), and/or other connection technologies.

The remote computing resources 136 and the SMT service 100 executing thereon, may receive, via the network 150, third party data 111 from any of a variety of third parties, such as banking, automation, security, credit risk, spam detection, e-commerce, etc., for which SMT problems and SMT solvers are utilized. In addition, or as an alternative, the remote computing resources 136 and the SMT service 100 executing thereon, may receive local data 102 from one or more local services, such as banking, automation, security, credit risk, spam detection, e-commerce, etc. Received data, local data, and/or DNNs discussed herein may be stored in memory of the computing resources 136 and/or in a data store 118 that is communicatively coupled to the remote computing resources 136 and the SMT service 100.

For example, a party, such as a third party, may provide an SMT problem and optionally corresponding data (or access thereto), to the SMT service 100 and the SMT service 100 may be able to provide to the party an expected processing time, an adjusted SMT problem configuration, and indication of an adjusted SMT solver, an adjusted SMT solver configuration, and/or process the SMT problem for the party.

Figure 2:
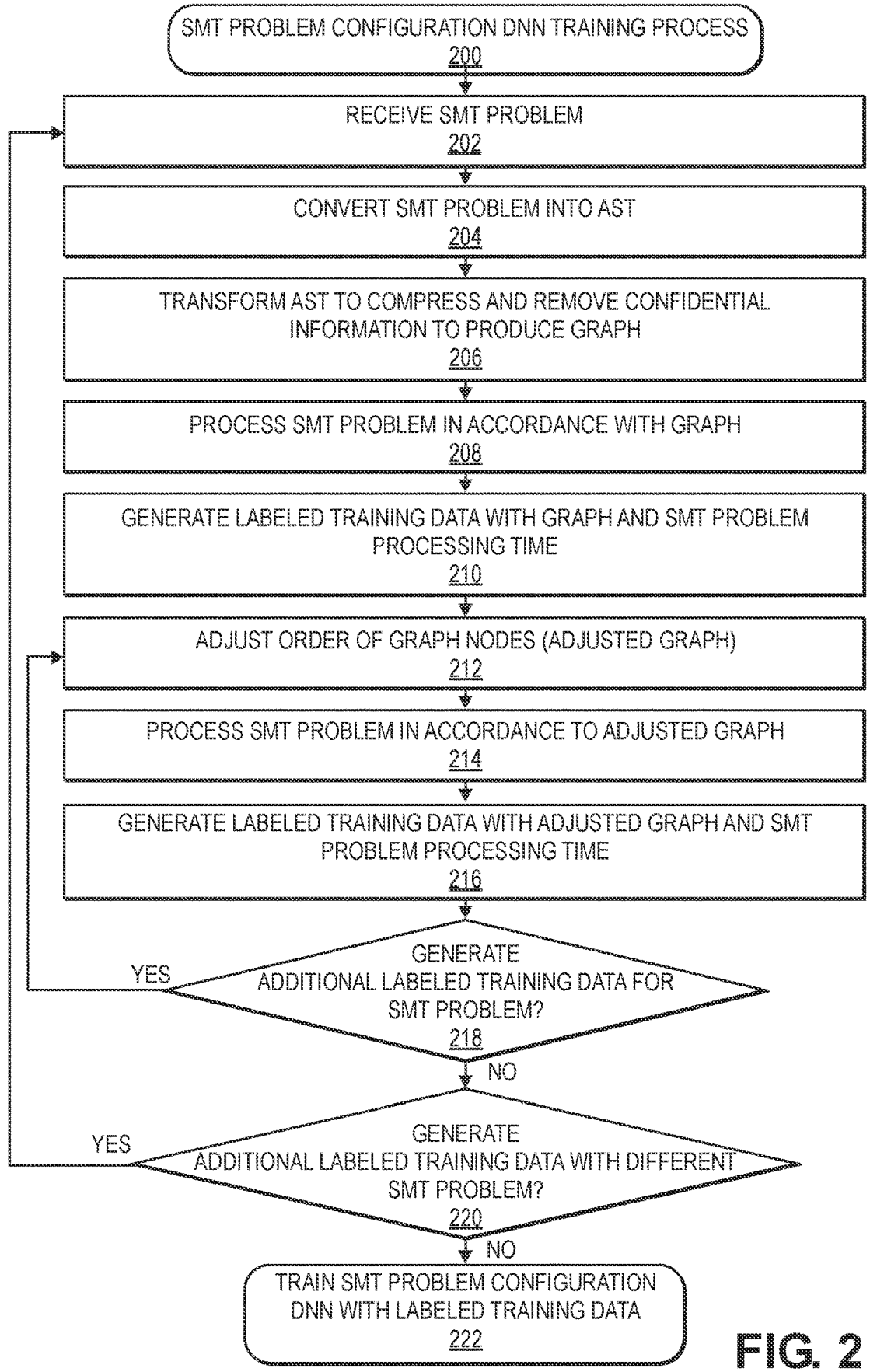
FIG. 2 is an example SMT problem configuration Deep Neural Network ("DNN") training process, in accordance with disclosed implementations.

FIG. 2 is an example SMT problem configuration DNN training process 200, in accordance with disclosed implementations.

The example process 200 begins upon receipt of an SMT problem, as in 202. As is known, SMT problems may be created for any of a variety of purposes and are viable tools for both decidable and undecidable theories. For example, SMT problems and SMT solvers are often used for verification of computer programs, to translate preconditions, postconditions, loops, assertions, terms, etc., into SMT problems to determine if all properties of the computer program can hold. SMT problems and SMT solvers are also often used to find security vulnerabilities, verify circuitry, etc.

The received SMT problem may be converted into an abstract syntax tree ("AST") in which nodes of the tree represent parts (e.g., assertions, terms, etc.) of the SMT problem and indicate an order in which the parts of the SMT problem may be processed by an SMT solver, as in 204. The AST may then be transformed by the example process 200 to compress the AST and to remove any confidential information included in the AST, as in 206. For example, the example process 200 may utilize one or more rules to process nodes of the AST and combine multiple nodes into a single node, remove unnecessary nodes, etc., thereby compressing the size of the AST and producing a graph. For example, a rule may be defined to process the AST to remove variable names and replace those removed variable names with unique identifiers, such as unique numerical identifiers. As another example, a rule may be defined to process the AST and adjust the graph such that a single node of the graph is used to represent each distinct variable of the SMT problem, rather than including a node in the graph each time the variable appears in the SMT problem. As still another example, a rule may be defined to process the AST to remove strings and/or other constant values and replace them with a feature, such as a string length. Other rules may be utilized to compress the size of the AST and produce the graph.

Likewise, the rules may also be used to identify and remove any confidential information, such as user identifiable information, credit card information, social security numbers, passwords, addresses, etc. Once compressed, the resulting graph is representative of an order in which parts of the SMT problem will be processed by an SMT solver.

In addition to converting the SMT problem into a graph, the SMT problem may also be provided to and processed by an SMT solver to determine a processing time required by the SMT solver to process the SMT problem according to the configuration indicated in the graph, as in 208.

Labeled training data may then be generated that includes the graph as the input and the processing time as the label, as in 210.

The order of the nodes of the graph may then be adjusted, as in 212. For example, the order of the nodes of the graph may be randomly rearranged to generate a different order of the nodes, and thus a different order in which parts of the SMT problem will be processed by the SMT solver. The SMT problem may again be processed by the SMT solver, according to the adjusted order of the graph, such that parts of the SMT problem are processed by the SMT solver in the order indicated in the adjusted graph, as in 214. As part of the processing, the processing time required to process the SMT problem according to the adjusted graph is determined. Additional labeled training data may then be generated that includes the adjusted graph and the processing time required to process the SMT problem in the order indicated in the adjusted graph, as in 216.

A determination may then be made as to whether additional labeled training data is to be generated from the SMT problem, as in 218. If it is determined that additional labeled training data is to be generated from the SMT problem, the example process 200 returns to block 212 and continues. In some instances, labeled training data from an SMT problem may be generated for a defined number of different ordering of parts of the SMT problem. If it is determined that additional labeled training data is not to be generated, a determination may be made as to whether additional labeled training data is to be generated from a different SMT problem, as in 220. If it is determined that additional labeled training data is to be generated, the example process 200 returns to block 202, selects a different SMT problem, and continues.

If it is determined at decision block 220 that no additional training data is to be generated, an SMT problem configuration DNN may be trained with the labeled training data, as in 222. In some implementations, the SMT problem configuration DNN may be trained to output an adjusted SMT problem ordering or configuration of the parts that will result in a shortest processing time for processing the SMT problem. In some implementations, the labeled training data may be used to generate an SMT problem processing time DNN that receives a graph of an SMT problem as an input and generates, based on the ordering of processing of the parts of the SMT problem indicated in the graph, a predicted processing time that will be required to process the SMT problem according to the ordering of the parts indicated in the graph. In some implementations, the SMT problem processing time DNN and/or other DNNs trained in accordance with the disclosed implementations, may also output an SMT problem representation that is representative of the SMT problem. For example, the SMT problem representation may be a vector representation of the SMT problem.

In some implementations, the SMT problem configuration DNN and/or the SMT problem processing time DNN may be a GNN. In other implementations, other forms of DNNs may be utilized. For example, a convolutional neural network ("CNN"), recurrent neural network ("RNN") and/or other types of DNNs may be utilized. Training of a DNN using labeled training data is discussed further below with respect to FIG. 10.

Figure 3:
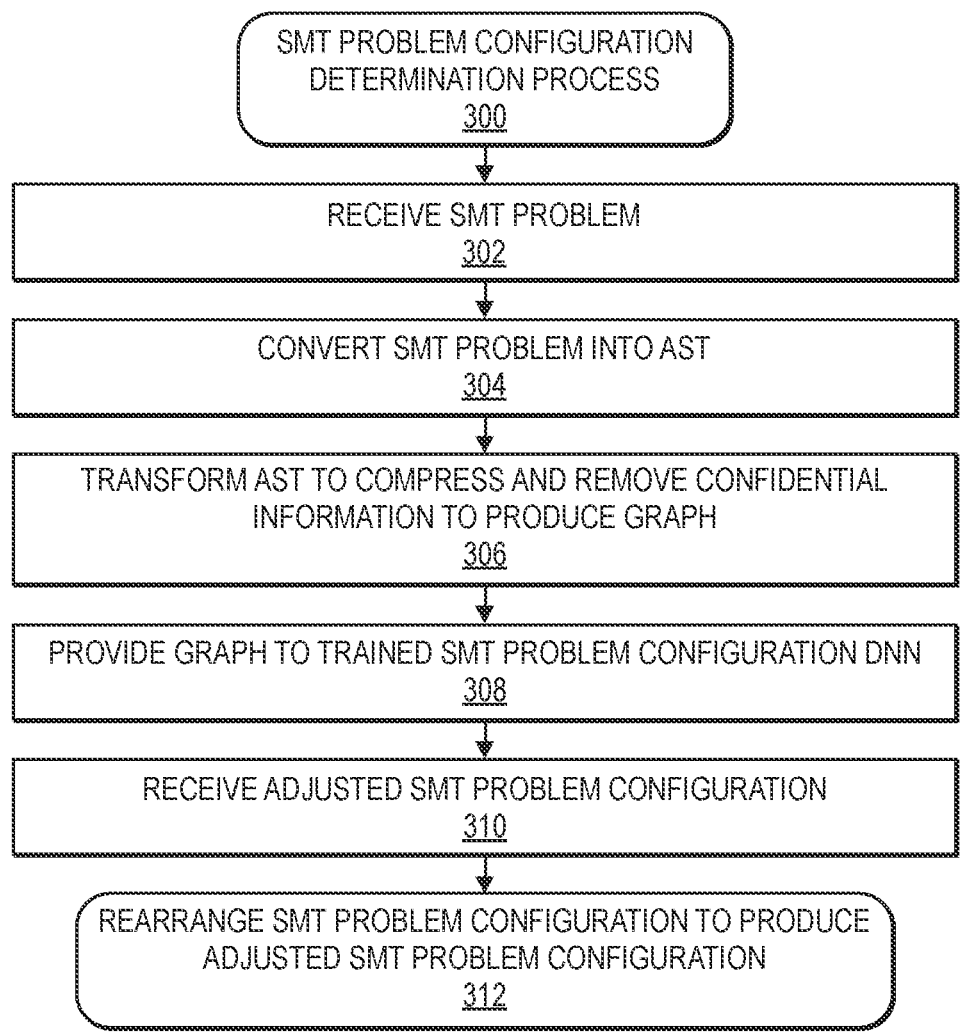
FIG. 3 is an example SMT problem configuration determination process, in accordance with disclosed implementations.

FIG. 3 is an example SMT problem configuration process 300, in accordance with disclosed implementations. The example process 300 may process an SMT problem using the DNN trained in accordance with the example process 200 (FIG. 2).

Similar to generation of labeled training data, the example process 300 begins upon receipt of an SMT problem, as in 302. The received SMT problem may be converted into an AST in which nodes of the tree represent parts (e.g., assertions, terms) of the SMT problem and indicate an order in which the parts of the SMT problem may be processed by an SMT solver, as in 304. The AST may then be transformed by the example process 300 to compress the AST and to remove any confidential information included in the AST, as in 306. For example, the example process 300 may utilize one or more rules to process nodes of the AST and combine multiple nodes into a single node, remove unnecessary nodes, etc., thereby compressing the size of the AST and producing a graph. Likewise, the rules may also be used to identify and remove any confidential information, such as user identifiable information, credit card information, social security numbers, passwords, addresses, etc. Once compressed, the resulting graph is representative of an order in which parts of the SMT problem will be processed by an SMT solver.

The graph may then be provided to an SMT problem configuration DNN that is trained to receive the graph as input, as in 308. The trained SMT problem configuration DNN may process the graph and provide, as an output, an ordering of the parts of the SMT problem so that processing of the SMT problem by an SMT solver can be completed in a shortest amount of processing time, referred to as an adjusted SMT problem configuration, as in 310. If the ordering of the parts of the SMT problem are already in an ordering that will result in a shortest processing time, the trained DNN will output the same graph or ordering as was provided as input. However, if an adjusted ordering of the parts of the SMT problem are predicted by the DNN that result in a shorter processing time, the adjusted ordering or a graph indicating the predicted ordering may be output by the DNN.

Finally, the parts of the SMT problem may be rearranged to produce an adjusted SMT problem configuration for the SMT problem so that, when the SMT problem is processed by the SMT solver, it may be processed with the shortest amount of processing time when compared to the processing time that is expected to be required to process the SMT problem in a different ordering/configuration, as in 312.

Figure 4:
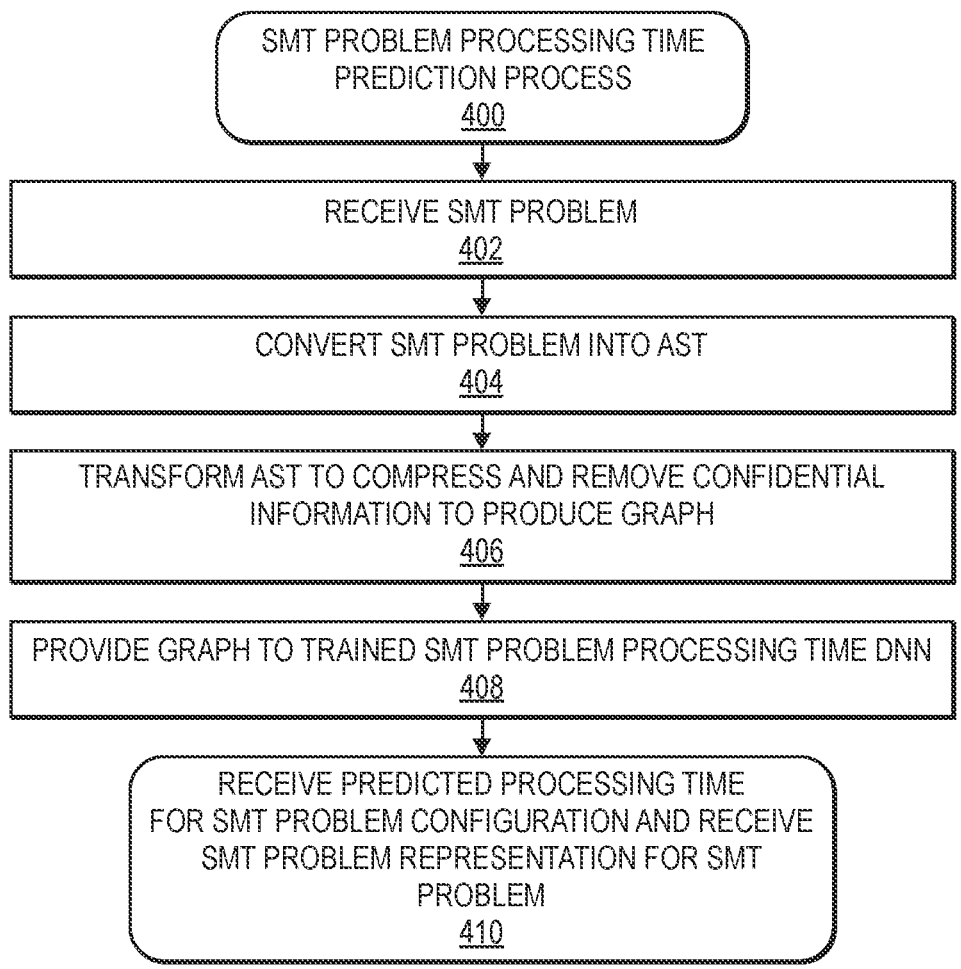
FIG. 4 is an example SMT problem processing time prediction process, in accordance with disclosed implementations.

FIG. 4 is an example SMT problem processing time prediction process 400, in accordance with disclosed implementations. In some implementations, an SMT problem with a default SMT problem configuration, an SMT problem with an adjusted SMT problem configuration, or any other SMT problem may be provided to the example process 400 and an expected processing time determined. The example process 400 may be performed by an SMT problem processing time DNN trained according to the example process 200 (FIG. 2) to receive, as input, a graph representative of an SMT problem configuration and provide, as output, an expected processing time for processing the SMT problem with an SMT solver.

Similar to generation of labeled training data, the example process 400 begins upon receipt of an SMT problem, as in 402. The received SMT problem may be converted into an AST in which nodes of the tree represent parts (e.g., assertions, terms) of the SMT problem and indicate an order in which the parts of the SMT problem may be processed by an SMT solver, as in 404. The AST may then be transformed by the example process 400 to compress the AST and to remove any confidential information included in the AST, as in 406. For example, the example process 400 may utilize one or more rules to process nodes of the AST and combine multiple nodes into a single node, remove unnecessary nodes, etc., thereby compressing the size of the AST and producing a graph. Likewise, the rules may also be used to identify and remove any confidential information, such as user identifiable information, credit card information, social security numbers, passwords, addresses, etc. Once compressed, the resulting graph is representative of an order in which parts of the SMT problem will be processed by an SMT solver.

The graph may then be provided to a DNN that is trained to receive the graph as input, such as an SMT problem processing time DNN, as in 408. The trained DNN may process the graph and provide, as an output, an expected processing time that is predicted to be required to process the SMT problem according to the ordering of the parts as represented in the graph, as in 410. In addition, the trained DNN may also output an SMT problem representation, such as a vector representation of the SMT problem. As discussed further below, the SMT problem representation may be received as an input by other DNNs trained in accordance with the disclosed implementations, such as an SMT solver selection DNN or an SMT solver configuration DNN.

Figure 5:
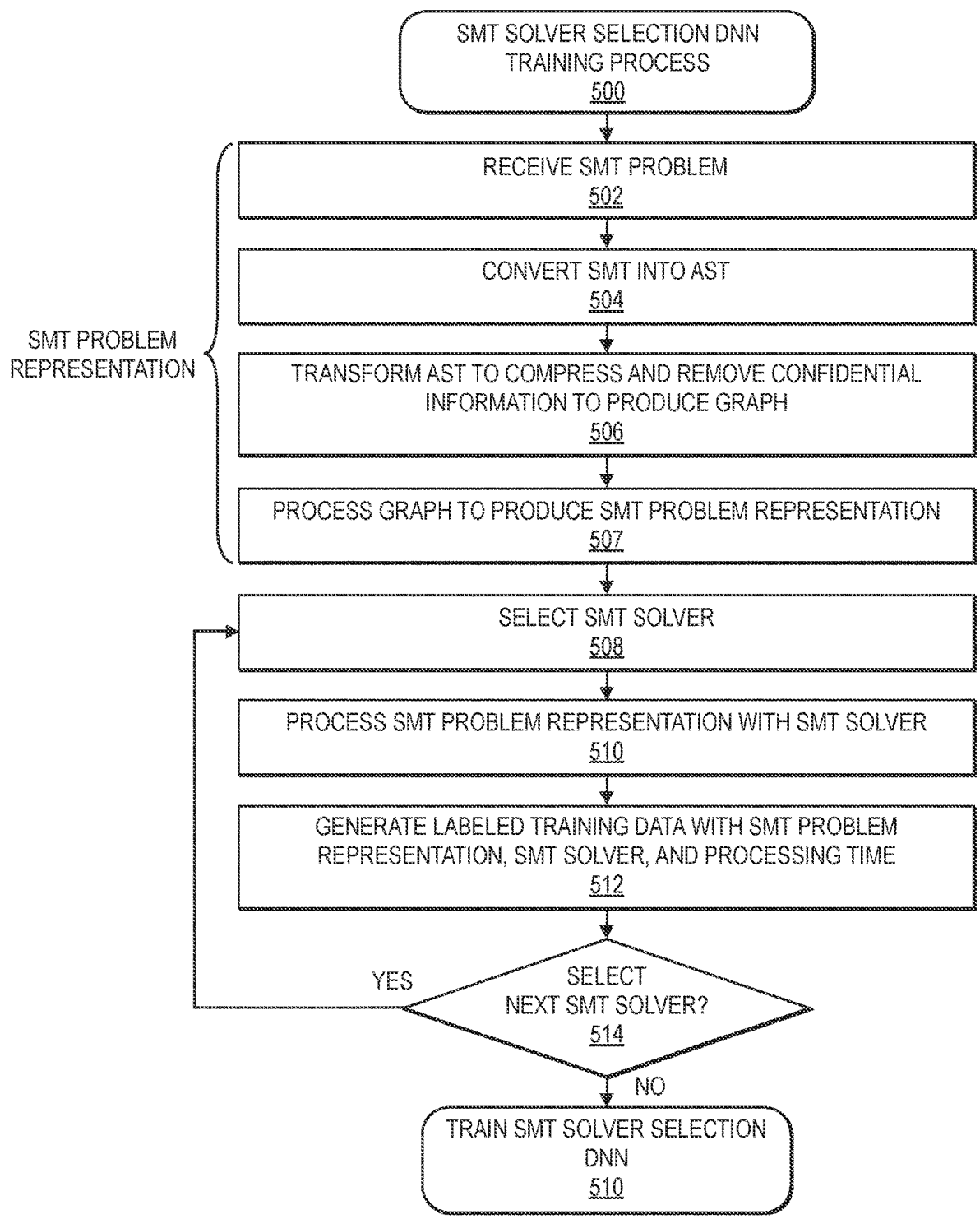
FIG. 5 is an example SMT solver selection DNN training process, in accordance with disclosed implementations.

FIG. 5 is an example SMT solver selection DNN training process 500, in accordance with disclosed implementations.

The example process 500 begins upon receipt of an SMT problem, as in 502. In some implementations, the received SMT problem may be converted into an AST in which nodes of the tree represent parts (e.g., assertions, terms) of the SMT problem and indicate an order in which the parts of the SMT problem may be processed by an SMT solver, as in 504. The AST may then be transformed by the example process 500 to compress the AST and to remove any confidential information included in the AST, as in 506. For example, the example process 500 may utilize one or more rules to process nodes of the AST and combine multiple nodes into a single node, remove unnecessary nodes, etc., thereby compressing the size of the AST and producing a graph. Likewise, the rules may also be used to identify and remove any confidential information, such as user identifiable information, credit card information, social security numbers, passwords, addresses, etc. Once compressed, the resulting graph is representative of an order in which parts of the SMT problem will be processed by an SMT solver.

The graph may then be processed by a DNN that is trained to process the graph and output an SMT problem representation, such as a vector representation of the SMT problem, as in 507. As discussed above, in some implementations, an SMT problem representation may be output by a DNN trained to determine an expected processing time that will be required to process the SMT problem by an SMT solver (SMT problem processing time DNN) and/or an SMT problem representation may be output by a DNN trained to determine an adjusted configuration for the SMT problem (SMT problem configuration DNN). In such an example, blocks 502, 504, and 506 may be omitted and the SMT problem representation generated by another trained DNN may be utilized by the example process 500. In still other examples, the graph generated from the AST at block 506 may be utilized as the SMT problem representation, rather than processing the graph with a trained DNN at block 507 to generate an SMT problem representation.

In addition to generating or receiving the SMT problem representation, an SMT solver may be selected, as in 508. As noted above, numerous SMT solvers exist, each with different features and aspects and some of which are better for processing some types of SMT problems while others are better for processing other types of SMT problems. In some implementations, the SMT solver may be randomly selected from a plurality of SMT solvers. In other implementations, the SMT problem may be initially queried and an SMT solver selected based on the parts or characteristics of the SMT problem.

Utilizing the selected SMT solver, the SMT problem is processed, and a processing time required to process the SMT problem with the selected SMT solver is determined, as in 510. Labeled training data may then be generated that includes the SMT problem representation and the processing time as the input and an indication of the SMT solver as the label, as in 512.

A determination may then be made as to whether another SMT solver is to be selected for use in generating labeled training data, as in 514. If it is determined that another SMT solver is to be selected, the example process 500 returns to block 508, selects a next SMT solver for processing the SMT problem, and continues. If it is determined that a next SMT solver is not to be selected, the labeled training data generated through the example process 500 is used to train an SMT solver selection DNN, as in 510. In one example, the SMT solver selection DNN, once trained, may be able to receive, as an input, the SMT problem or an SMT problem representation, such as a graph or vector representation, and determine a solver that will process the SMT problem in a shortest amount of processing time. In some implementations, the DNN may be a GNN that is trained to process a graph representative of the SMT problem. In other implementations, the DNN may be CNN, RNN, etc., that is trained to process a vector representation, or other representation, of the SMT problem. Training of a DNN using labeled training is discussed further below with respect to FIG. 10.

Figure 6:
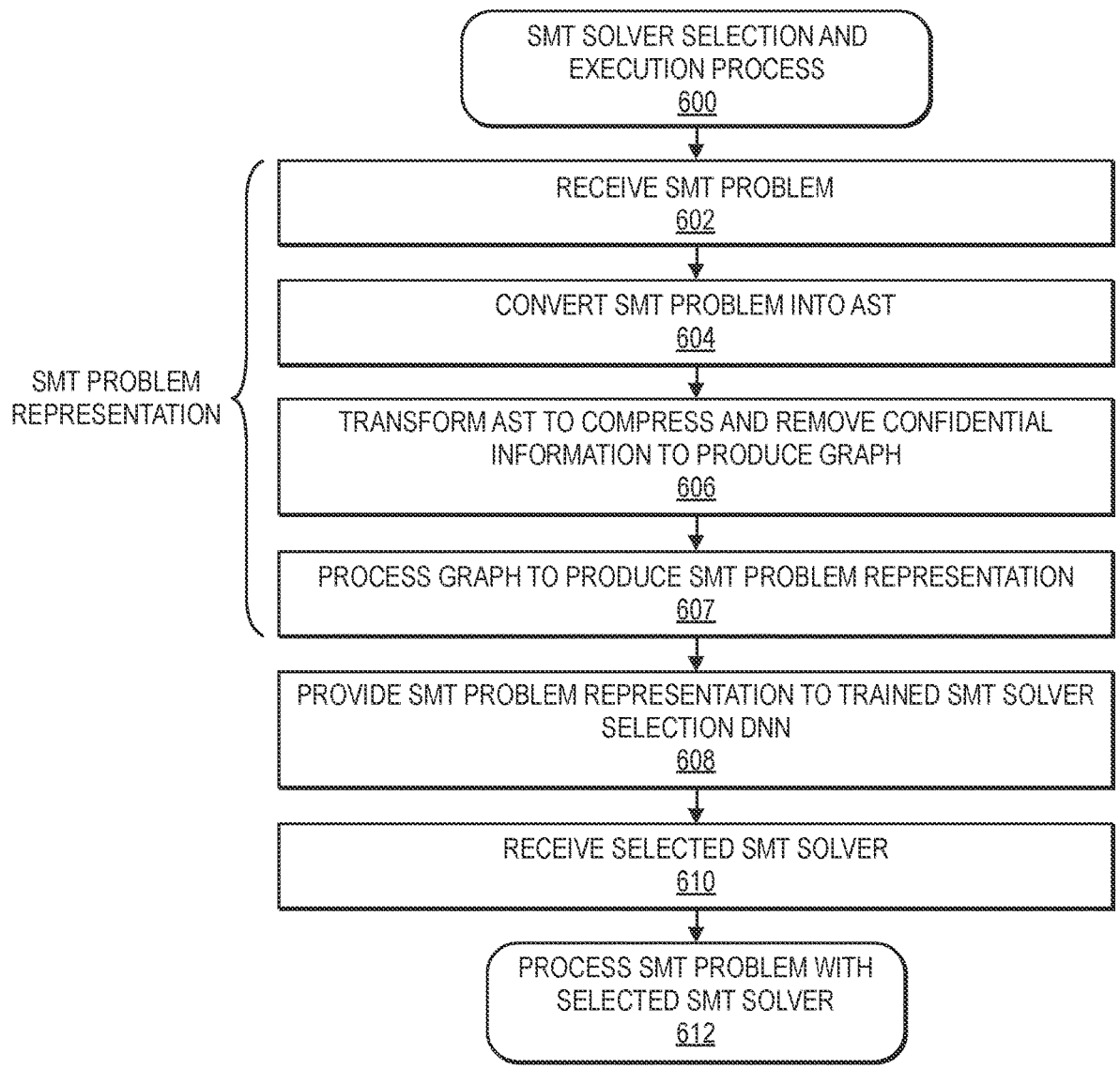
FIG. 6 is an example SMT solver selection and execution process, in accordance with disclosed implementations.

FIG. 6 is an example SMT solver selection and execution process 600, in accordance with disclosed implementations. In some implementations, an SMT problem with a default SMT problem configuration, an SMT problem with an adjusted SMT problem configuration, or any other SMT problem may be provided to the example process 600, an SMT solver selected based on the received SMT problem, and the SMT problem processed with the selected SMT solver. The example process may be performed by a DNN trained to receive, as input, an SMT problem representation and provide, as output, a selected SMT solver to process the SMT problem.

The example process 600 begins upon receipt of an SMT problem, as in 602. The received SMT problem may be converted into an AST in which nodes of the tree represent parts (e.g., assertions, terms) of the SMT problem and indicate an order in which the parts of the SMT problem may be processed by an SMT solver, as in 604. The AST may then be transformed by the example process 600 to compress the AST and to remove any confidential information included in the AST, as in 606. For example, the example process 600 may utilize one or more rules to process nodes of the AST and combine multiple nodes into a single node, remove unnecessary nodes, etc., thereby compressing the size of the AST and producing a graph. Likewise, the rules may also be used to identify and remove any confidential information, such as user identifiable information, credit card information, social security numbers, passwords, addresses, etc. Once compressed, the resulting graph is representative of an order in which parts of the SMT problem will be processed by an SMT solver.

The graph may then be processed by a DNN that is trained to process the graph and output an SMT problem representation, such as a vector representation of the SMT problem, as in 607. As discussed above, in some implementations, an SMT problem representation may be output by a DNN trained to determine an expected processing time that will be required to process the SMT problem by an SMT solver (SMT problem processing time DNN) and/or an SMT problem representation may be output by a DNN trained to determine an adjusted configuration for the SMT problem (SMT problem configuration DNN). In such an example, blocks 602, 604, and 606 may be omitted and the SMT problem representation generated by another trained DNN may be utilized by the example process 600. In still other examples, the graph generated from the AST at block 606 may be utilized as the SMT problem representation, rather than processing the graph with a trained DNN at block 607 to generate an SMT problem representation.

The SMT problem representation may then be provided to an SMT solver selection DNN that is trained to select an SMT solver that will process the SMT problem in a shortest processing time, as in 608. For example, the trained SMT solver selection DNN may process the SMT problem representation and provide, as an output, a selected SMT solver for processing the SMT problem, as in 610. Finally, the SMT problem may be provided to the selected SMT solver and processed, as in 612.

Figure 7A:
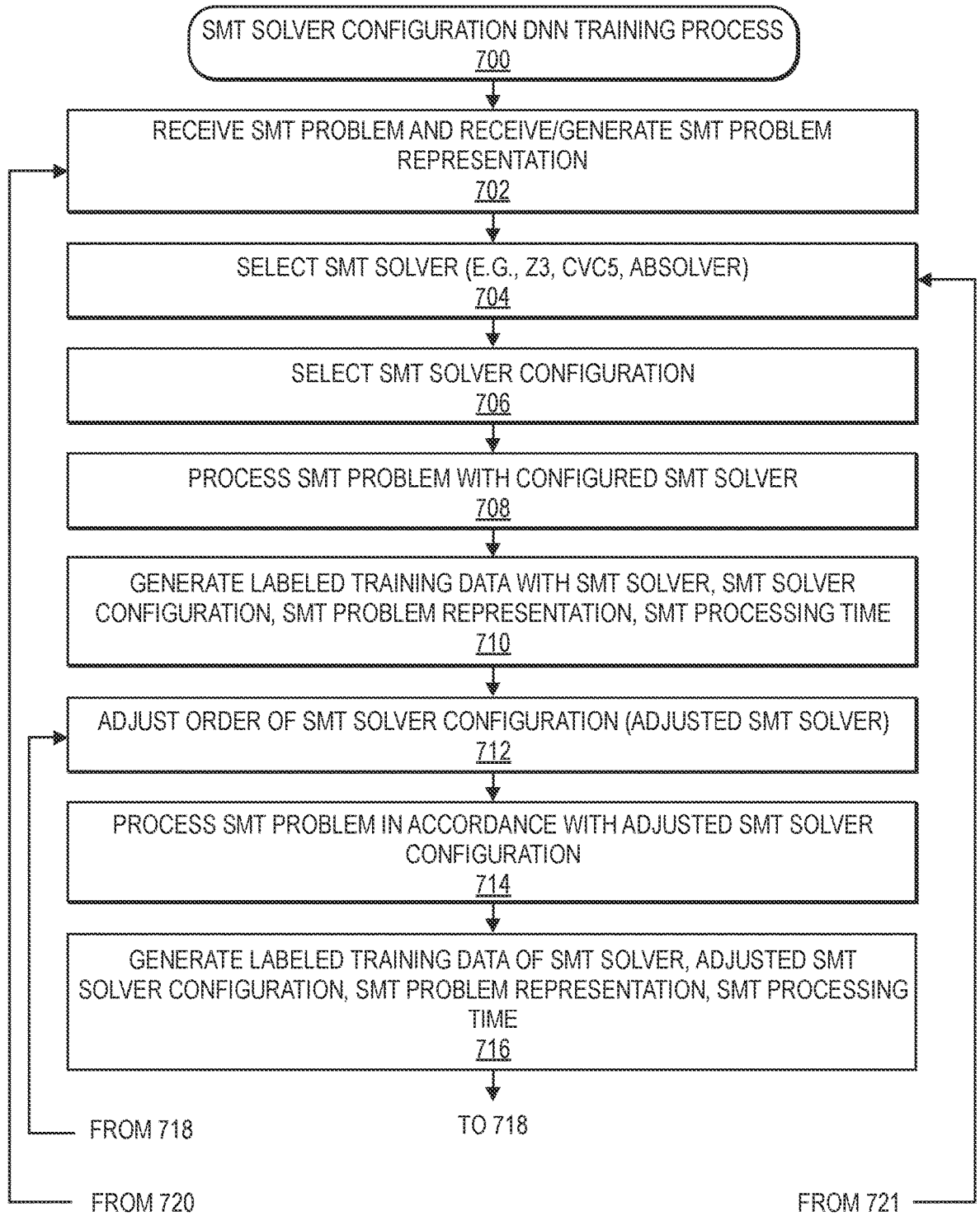
FIGS. 7A through 7B is an example SMT solver configuration DNN training process, in accordance with disclosed implementations.
Figure 7B:
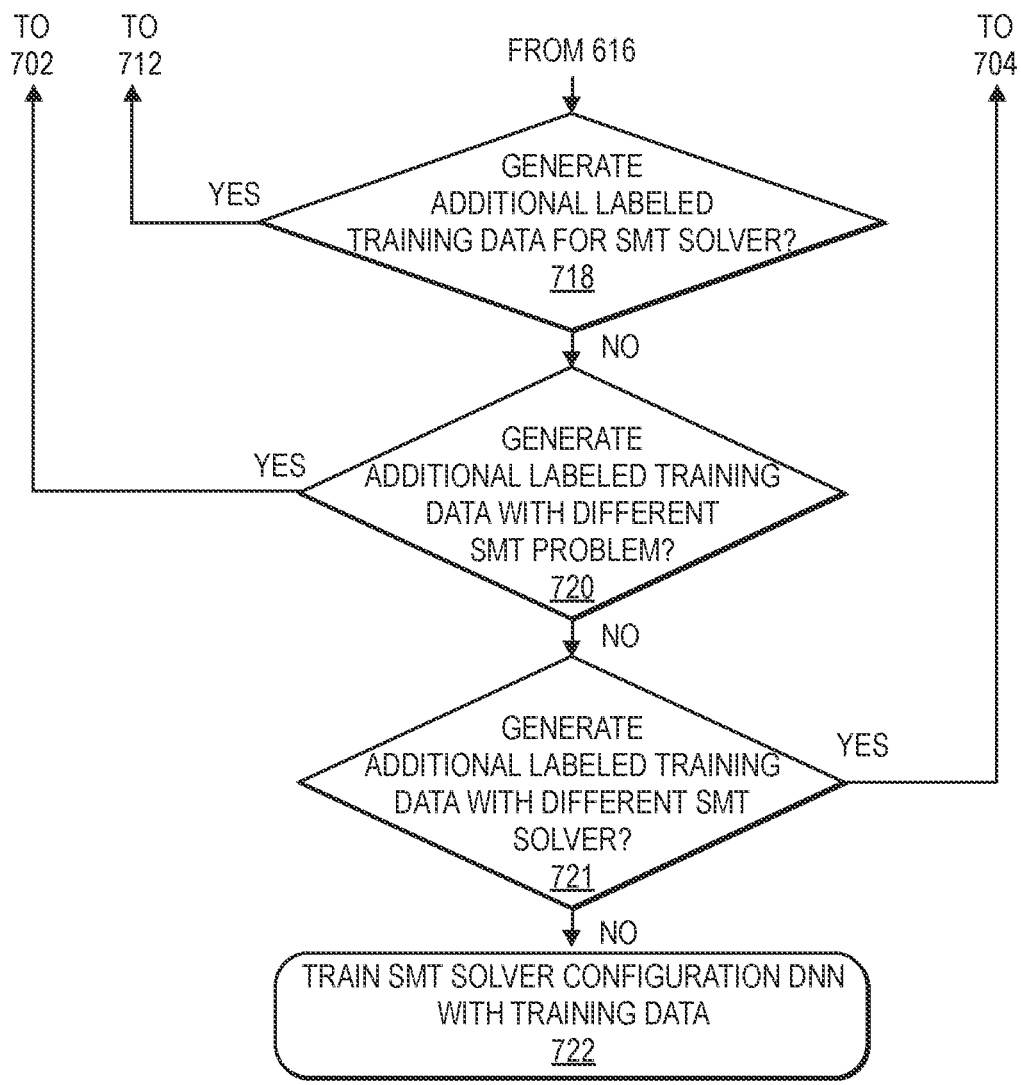

FIGS. 7A through 7B is an example SMT solver configuration DNN training process 700, in accordance with disclosed implementations.

Referring first to FIG. 7A, the example process 700 begins upon receipt of an SMT problem, as in 702. In addition, an SMT problem representation, generated by one of the other DNNs trained in accordance with the disclosed implementations, as discussed above, may be received. Alternatively, the received SMT problem may be processed, as discussed above, to convert the SMT problem into a graph and process the graph with a DNN to generate an SMT problem representation. In still other examples, the graph may be utilized as the SMT problem representation.

The example process 700 may also select an SMT solver, as in 704. As noted above, numerous SMT solvers exist (e.g., Z3, CVC5, ABsolver, etc.), each with different features and aspects and some of which are better for processing some types of SMT problems while others are better for processing other types of SMT problems. In some implementations, the SMT solver may be randomly selected from a plurality of SMT solvers. In other implementations, the SMT problem may be initially queried and an SMT solver selected based on the parts or characteristics of the SMT problem.

In addition, an SMT solver configuration may be selected for the SMT solver, as in 706. Like selection of the SMT solver, in some implementations, the SMT solver configuration may be randomly selected. The received SMT problem may then processed by the selected SMT solver according to the SMT solver configuration, as in 708, and a processing time determined. Labeled training data that includes the SMT problem representation, an indication of the SMT solver, and the processing time as inputs, and the SMT solver configuration as a label may then be generated, as in 710. In some implementations, the SMT solver configuration may be represented as a graph, vector, or other representation indicative of the configuration of options for the SMT solver.

The SMT solver configuration may then be reordered or rearranged such that the SMT solver has a different configuration, referred to herein as an adjusted SMT solver configuration, as in 712. In some implementations, the adjustment of the SMT solver configuration may be random.

Utilizing the adjusted SMT solver with the adjusted SMT solver configuration, the SMT problem may again be processed, as in 714, and a processing time for processing the SMT problem with the adjusted SMT solver determined. Labeled training data may then be generated that includes the SMT problem representation, an indication of the adjusted SMT solver, and the processing time as inputs, and the adjusted SMT solver configuration as a label, as in 716.

Referring now to FIG. 7B, a determination may then be made as to whether additional labeled training data is to be generated for the SMT solver, as in 718. If it is determined that additional labeled training data is to be generated for the SMT solver, the example process 700 returns to block 712 and continues. In some instances, labeled training data from an SMT solver may be generated for a defined number of different arrangements of configurations for the SMT solver. If it is determined that additional labeled training data is not to be generated, a determination may be made as to whether additional labeled training data is to be generated using a different SMT problem, as in 720. If it is determined that additional labeled training data is to be generated using a different SMT problem, the example process 700 returns to block 702, selects a new SMT problem, and continues.

If it is determined at decision block 720 that no additional training data is to be generated with a different SMT problem, a determination may be made as to whether additional labeled training data is to be generated using a different SMT solver, as in 721. In some implementations, a defined number of SMT solvers may be processed to generate labeled training data for training the SMT solver configuration DNN. In such an example, the SMT solver configuration DNN may be configured to determine an adjusted SMT solver and an adjusted SMT solver configuration for the determined adjusted SMT solver such that a processing time of an input SMT problem is minimized. In other implementations, the example process 700 may be performed for different SMT solvers with different SMT solver configuration DNNs created for each of the different SMT solvers.

If it is determined that additional labeled training data is to be generated using a different SMT solver, the example process 700 returns to block 704, selects a next SMT solver, and continues. If it is determined that additional labeled training data is not to be generated using a different SMT solver, an SMT solver configuration DNN may be trained with the labeled training data, as in 722. In some implementations, the SMT solver configuration DNN may be trained to output an adjusted SMT solver configuration that will result in a shortest processing time for processing an input SMT problem. In other implementations, the SMT solver configuration DNN may be trained to both select an SMT solver and determine an adjusted SMT solver configuration for a received SMT problem.

In some implementations, the SMT solver configuration DNN may be a GNN. In other implementations, other forms of DNNs may be utilized. For example, a CNN, RNN, and/or other form of DNN may be utilized as the SMT solver configuration DNN. Training of a DNN using labeled training data is discussed further below with respect to FIG. 10.

Figure 8:
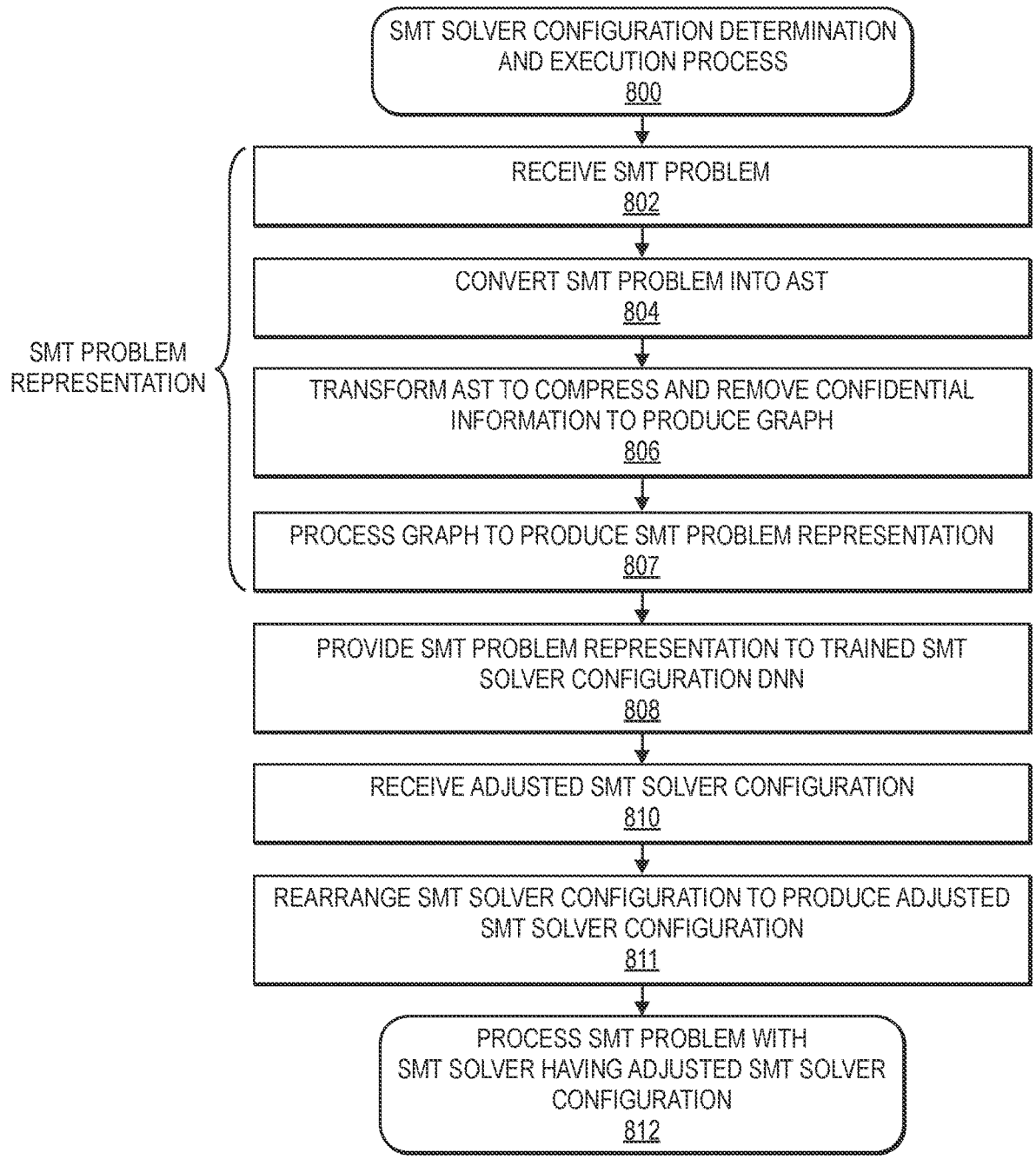
FIG. 8 is an example SMT solver configuration determination and execution process, in accordance with disclosed implementations.

FIG. 8 is an example SMT solver configuration and execution process 800, in accordance with disclosed implementations. The example process may process an SMT problem using the DNN trained in accordance with the example process 700 (FIG. 7).

Similar to generation of labeled training data, the example process 800 begins upon receipt of an SMT problem, as in 802. The received SMT problem may be converted into an AST in which nodes of the tree represent parts (e.g., assertions, terms) of the SMT problem and indicate an order in which the parts of the SMT problem may be processed by an SMT solver, as in 804. The AST may then be transformed by the example process 800 to compress the AST and to remove any confidential information included in the AST, as in 806. For example, the example process 800 may utilize one or more rules to process nodes of the AST and combine multiple nodes into a single node, remove unnecessary nodes, etc., thereby compressing the size of the AST and producing a graph. Likewise, the rules may also be used to identify and remove any confidential information, such as user identifiable information, credit card information, social security numbers, passwords, addresses, etc. Once compressed, the resulting graph is representative of an order in which parts of the SMT problem will be processed by an SMT solver.

The graph may then be processed by a DNN that is trained to process the graph and output an SMT problem representation, such as a vector representation of the SMT problem, as in 807. As discussed above, in some implementations, an SMT problem representation may be output by a DNN trained to determine an expected processing time that will be required to process the SMT problem by an SMT solver (SMT problem processing time DNN) and/or an SMT problem representation may be output by a DNN trained to determine an adjusted configuration for the SMT problem (SMT problem configuration DNN). In such an example, blocks 802, 804, and 806 may be omitted and the SMT problem representation generated by another trained DNN may be utilized by the example process 800. In still other examples, the graph generated from the AST at block 806 may be utilized as the SMT problem representation, rather than processing the graph with a trained DNN at block 807 to generate an SMT problem representation.

The SMT problem representation may then be provided to an SMT solver configuration DNN that is trained to receive the SMT problem representation as input, as in 808. The trained DNN may process the SMT problem representation and provide, as an output, an SMT solver configuration for an SMT solver that will process the SMT problem (adjusted SMT solver configuration), as in 810. In some implementations, the trained DNN may be trained for a specific SMT solver, and the provided SMT solver configuration may be specific to that SMT solver. In other implementations, the trained DNN may be trained to both select an SMT solver from a plurality of SMT solvers and select an SMT solver configuration for that SMT solver.

The SMT solver configuration may then be rearranged based on the output from the trained DNN to produce an adjusted SMT solver configuration for the SMT solver such that processing of the SMT problem by the SMT solver using the SMT solver configuration will be a shortest processing time compared to other SMT solver configurations of the same and/or different SMT solvers, as in 811. Finally, the SMT problem is processed with the SMT solver using the adjusted SMT solver configuration, as in 812.

Figure 9:
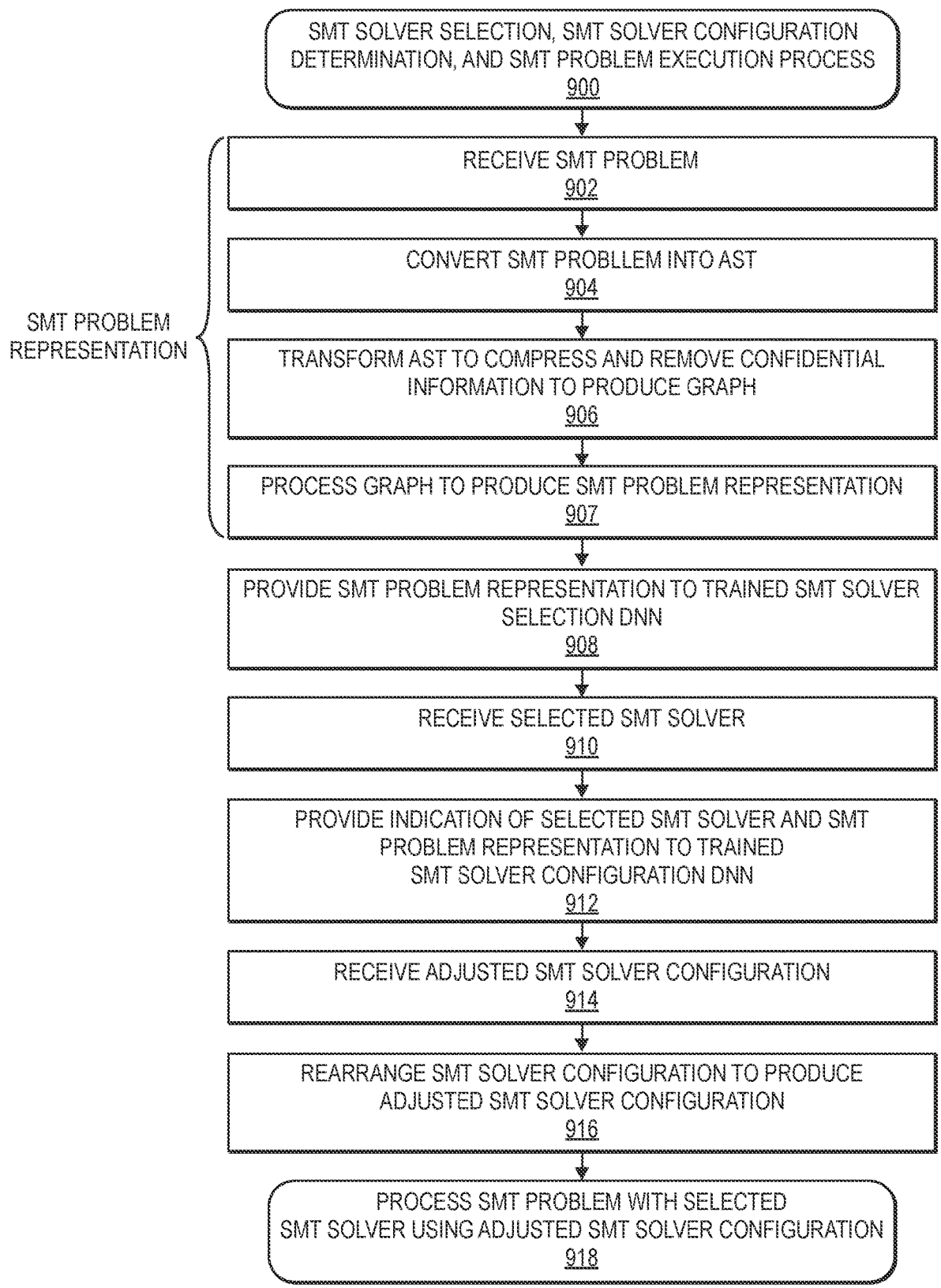
FIG. 9 is an example SMT solver selection, SMT solver configuration determination, and SMT problem execution process, in accordance with disclosed implementations.

FIG. 9 is an example SMT solver selection, SMT solver configuration, and SMT problem execution process 900, in accordance with disclosed implementations.

The example process 900 begins upon receipt of an SMT problem, as in 902. The received SMT problem may be converted into an AST in which nodes of the tree represent parts (e.g., assertions, terms) of the SMT problem and indicate an order in which the parts of the SMT problem may be processed by an SMT solver, as in 904. The AST may then be transformed by the example process 900 to compress the AST and to remove any confidential information included in the AST, as in 906. For example, the example process 900 may utilize one or more rules to process nodes of the AST and combine multiple nodes into a single node, remove unnecessary nodes, etc., thereby compressing the size of the AST and producing a graph. Likewise, the rules may also be used to identify and remove any confidential information, such as user identifiable information, credit card information, social security numbers, passwords, addresses, etc. Once compressed, the resulting graph is representative of an order in which parts of the SMT problem will be processed by an SMT solver.

The graph may then be processed by a DNN that is trained to process the graph and output an SMT problem representation, such as a vector representation of the SMT problem, as in 907. As discussed above, in some implementations, an SMT problem representation may be output by a DNN trained to determine an expected processing time that will be required to process the SMT problem by an SMT solver (SMT problem processing time DNN) and/or an SMT problem representation may be output by a DNN trained to determine an adjusted configuration for the SMT problem (SMT problem configuration DNN). In such an example, blocks 902, 904, and 906 may be omitted and the SMT problem representation generated by another trained DNN may be utilized by the example process 900. In still other examples, the graph generated from the AST at block 906 may be utilized as the SMT problem representation, rather than processing the graph with a trained DNN at block 907 to generate an SMT problem representation.

The SMT problem representation may then be provided to an SMT solver selection DNN that is trained to receive the SMT problem representation as input, as in 908. The trained DNN may process the SMT problem representation and provide, as an output, a selection of an SMT solver that will provide a shortest processing time when processing the SMT problem, referred to herein as an adjusted SMT solver, as in 910.

An indication of the adjusted SMT solver and the SMT problem representation may then be provided to a trained SMT solver configuration DNN, as in 912. In some implementations, the trained DNN may be trained for the specific SMT solver indicated as an input. In other implementations, the trained DNN may be trained for multiple different SMT solvers and utilize the indicated SMT solver as an input for determining an SMT solver configuration for that SMT solver.

The trained DNN may then output an adjusted SMT solver configuration, as in 914. The SMT solver configuration may then be updated based on the output from the trained DNN to produce an adjusted SMT solver configuration for the adjusted SMT solver such that processing of the SMT problem by the adjusted SMT solver using the adjusted SMT solver configuration will be a shortest processing time compared to other SMT solver configurations of the same and/or different SMT solvers, as in 916. Finally, the SMT problem is processed with the adjusted SMT solver using the adjusted SMT solver configuration, as in 918.

Figure 10:
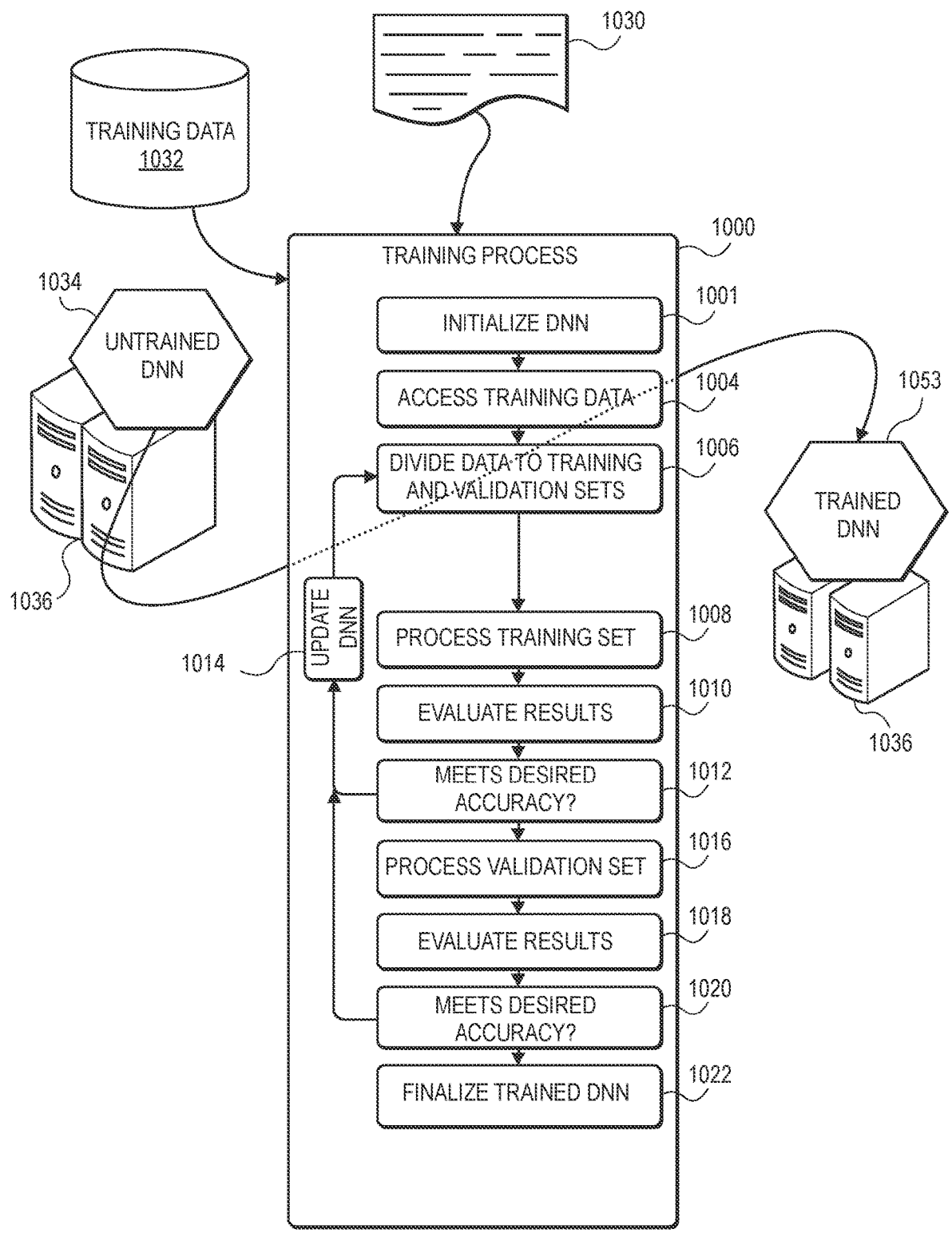
FIG. 10 illustrates an exemplary overall process of training a DNN in accordance with aspects of the disclosed subject matter.

FIG. 10 illustrates an exemplary overall process 1000 of training a DNN, such as the herein discussed SMT problem configuration DNN, SMT solver selection DNN, SMT solver configuration DNN, etc., in accordance with aspects of the disclosed subject matter. Indeed, as shown in FIG. 10, the training process 1000 is configured to train an untrained DNN 1034 operating on a computer system 1036 to transform the untrained DNN into a trained DNN 1053 that operates on the same or another computer system, such as a remote computing resource 1036. In the course of training, as shown in the training process 1000, at step 1001, the untrained DNN 1034 is initialized with training criteria 1030. Training criteria 1030 may include, but is not limited to, information as to a type of training, and number of layers to be trained, etc.

At step 1004 of training process 1000, a corpus of training data 1032, which may include some or all of the labeled training data generated in accordance with the above described implementations, is accessed. For example, if training is to generate a trained DNN 1053 that determines an SMT problem configuration indicating an ordering of parts of the SMT problem, the training data 1032 may include labeled training data generated by the example SMT problem configuration DNN training process 200 (FIG. 2). While the disclosed implementations discuss the use of labeled training data, in various implementations, the training data 1032 may also or alternatively include unlabeled training data.

With the training data 1032 accessed, at step 1006 the training data is divided into training and validation sets. Generally speaking, the items of data in the training set are used to train the untrained DNN 1034 and the items of data in the validation set are used to validate the training of the DNN. As those skilled in the art will appreciate, and as described below in regard to much of the remainder of training process 1000, there are numerous iterations of training and validation that occur during the training of the DNN.

At step 1008 of the training process, the data items of the training set are processed, often in an iterative manner. Processing the data items of the training set include capturing the processed results. After processing the items of the training set, at step 1010, the aggregated results of processing the training set are evaluated, and at step 1012, a determination is made as to whether a desired accuracy level has been achieved. If the desired accuracy level is not achieved, in step 1014, aspects of the DNN are updated in an effort to guide the DNN to generate more accurate results, and processing returns to step 1006, where a new set of training data is selected, and the process repeats. Alternatively, if the desired accuracy level is achieved, the training process 1000 advances to step 1016.

At step 1016, and much like step 1008, the data items of the validation set are processed, and at step 1018, the processing accuracy of this validation set is aggregated and evaluated. At step 1020, a determination is made as to whether a desired accuracy level, in processing the validation set, has been achieved. If the desired accuracy level is not achieved, in step 1014, aspects of the DNN are updated in an effort to guide the DNN to generate more accurate results, and processing returns to step 1006. Alternatively, if the desired accuracy level is achieved, the training process 1000 advances to step 1022.

At step 1022, a finalized, trained DNN 1053 is generated. Typically, though not exclusively, as part of finalizing the now-trained DNN 1053, portions of the DNN that are included in the model during training for training purposes are extracted, thereby generating a more efficiently trained DNN 1053.

Figure 11:
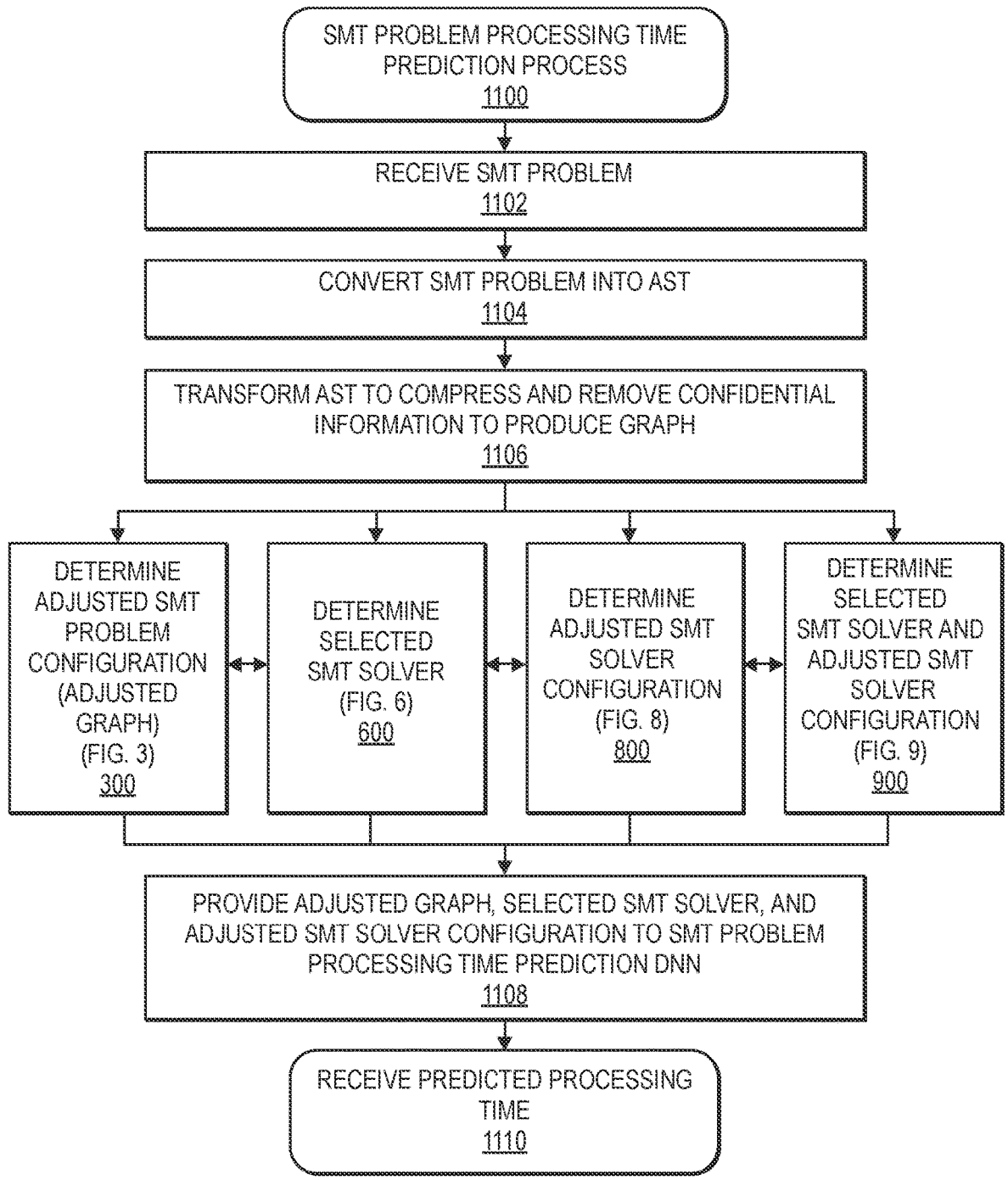
FIG. 11 is an example SMT problem processing time prediction process, in accordance with disclosed implementations.

FIG. 11 is an example SMT problem processing time prediction process 1100, in accordance with disclosed implementations. The example process 1100 may be utilized with some or all of the above described implementations, as discussed further below.

The example process 1100 begins upon receipt of an SMT problem, as in 1102. The received SMT problem may be converted into an AST in which nodes of the tree represent parts (e.g., assertions, terms) of the SMT problem and indicate an order in which the parts of the SMT problem may be processed by an SMT solver, as in 1104. The AST may then be transformed by the example process 1100 to compress the AST and to remove any confidential information included in the AST, as in 1106. For example, the example process 1100 may utilize one or more rules to process nodes of the AST and combine multiple nodes into a single node, remove unnecessary nodes, etc., thereby compressing the size of the AST and producing a graph. Likewise, the rules may also be used to identify and remove any confidential information, such as user identifiable information, credit card information, social security numbers, passwords, addresses, etc. Once compressed, the resulting graph is representative of an order in which parts of the SMT problem will be processed by an SMT solver. In some implementations, the graph may also be processed using a DNN trained to receive the graph, as an input, and generate, as an output, an SMT problem representation, as discussed above.

The graph and/or the SMT problem representation may then be provided to one or more of the example process 300 (FIG. 3) to determine an adjusted SMT problem configuration (altered graph), the example process 600 (FIG. 6) to select an SMT solver, the example process 800 (FIG. 8) to determine an adjusted SMT solver configuration, and/or to the example process 900 (FIG. 9) to select an SMT solver and determine adjusted SMT solver configuration. The outputs from one or more of the example processes 300, 600, 800, 900 of an adjusted SMT problem configuration (altered graph), selected SMT solver, and/or adjusted SMT solver configuration may be provided to a trained DNN that predicts a processing time required to process the SMT problem, optionally using the selected SMT solver with the further option of the SMT solver configuration, as in 1108. If one or more of the example process 300, 600, 800, 900 are not utilized, a default or known value may be provided as the input of one or more of the SMT problem representation, SMT solver, and/or SMT solver configuration.

The DNN may receive the inputs, process those inputs, and provide the predicted processing time, as in 1110.

Figure 12:
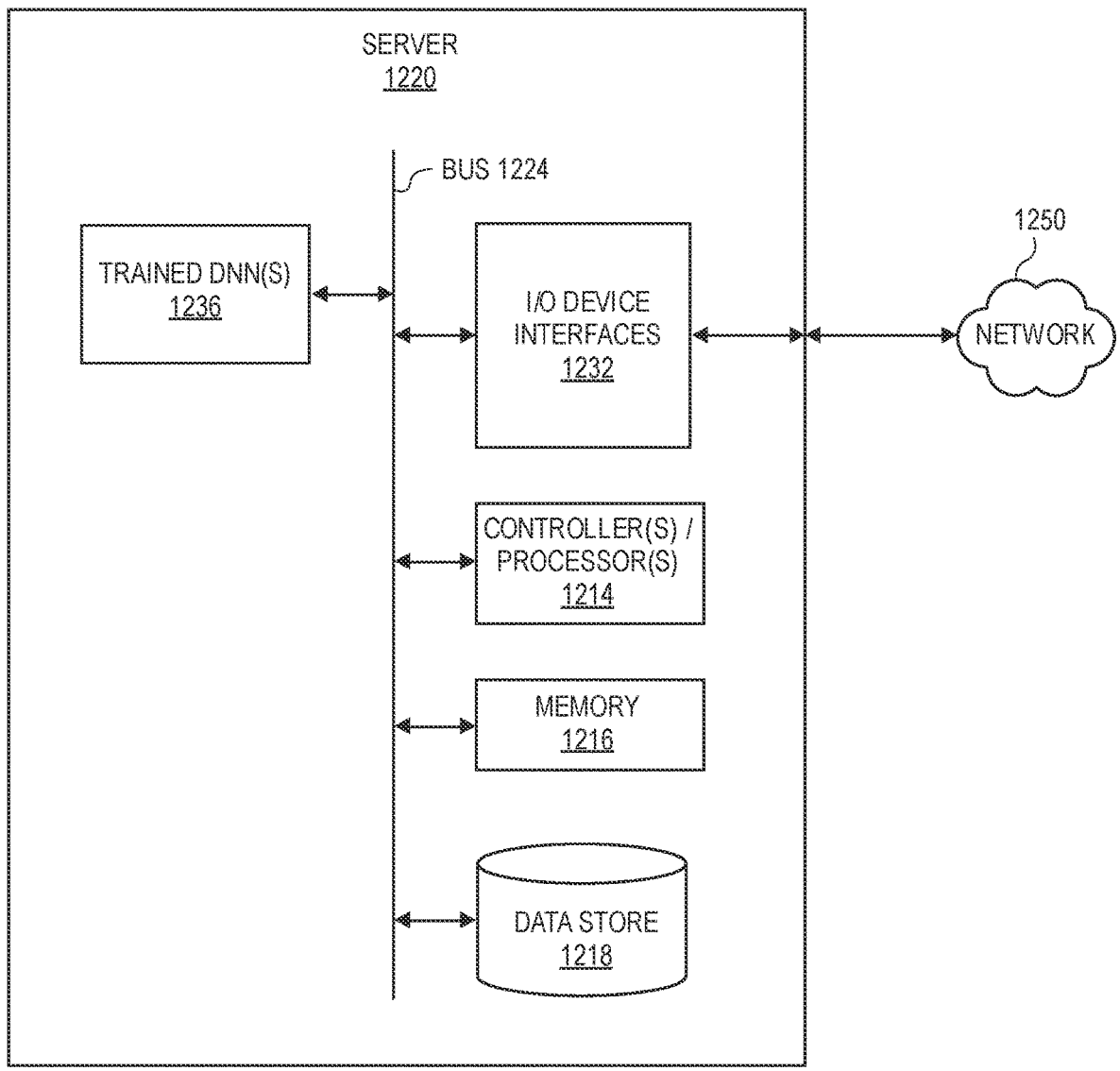
FIG. 12 illustrates example components of a server, in accordance with disclosed implementations.

FIG. 12 is a block diagram conceptually illustrating example components of a remote computing device, such as a remote server 1220 that may include and/or execute one or more of the above discussed trained DNNs and/or processes, in accordance with described implementations. Multiple such servers 1220 may be included in the system.

Each of these server(s) 1220 may include one or more controllers/processors 1214, that may each include a central processing unit (CPU) for processing data and computer-readable instructions, and a memory 1216 for storing data and instructions. The memory 1216 may individually include volatile random access memory (RAM), non-volatile read only memory (ROM), non-volatile magnetoresistive random access memory (MRAM) and/or other types of memory. Each server may also include a data storage component 1218, for storing data, controller/processor-executable instructions, training data, labels, etc. Each data storage component may individually include one or more non-volatile storage types such as magnetic storage, optical storage, solid-state storage, etc. Each server may also be connected to removable or external non-volatile memory and/or storage (such as a removable memory card, memory key drive, networked storage, etc.), internal, and/or external networks 1250 (e.g., the Internet) through respective input/output device interfaces 1232.

Computer instructions for operating each server 1220 and its various components may be executed by the respective server's controller(s)/processor(s) 1214, using the memory 1216 as temporary "working" storage at runtime. A server's computer instructions may be stored in a non-transitory manner in non-volatile memory 1216, storage 1218, and/or an external device(s). Alternatively, some or all of the executable instructions may be embedded in hardware or firmware on the respective device in addition to or instead of software.

Each server 1220 includes input/output device interfaces 1232. A variety of components may be connected through the input/output device interfaces. Additionally, each server 1220 may include an address/data bus 1224 for conveying data among components of the respective server. Each component within a server 1220 may also be directly connected to other components in addition to (or instead of) being connected to other components across the bus 1224. Each server may also include one or more trained DNNs 1236, as discussed herein.

The components of the server(s) 1220, as illustrated in FIG. 12, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Moreover, with respect to the one or more methods or processes of the present disclosure shown or described herein, including but not limited to the flow charts shown in FIGS. 2 through 11, orders in which such methods or processes are presented are not intended to be construed as any limitation on the claimed inventions, and any number of the method or process steps or boxes described herein can be combined in any order, in parallel, and/or be omitted to implement the methods or processes described herein. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
    for each of a plurality of satisfiability modulo theories ("SMT") problems:
        converting the SMT problem into an abstract syntax tree ("AST") that includes a plurality of nodes representative of parts of the SMT problem;
        transforming the AST into a graph by, at least:
            compressing the AST through removal of at least one node from the AST; and
            removing confidential information included in the AST;
        processing the graph with a graph neural network ("GNN") to generate an SMT problem representation of the SMT problem;
        processing the SMT problem, using an SMT solver having an SMT solver configuration, to determine a processing time required by the SMT solver having the SMT solver configuration to process the SMT problem; and
        generating labeled training data that includes at least the SMT problem representation, an indication of the SMT solver configuration, and the processing time;
    training, with the labeled training data, a deep neural network ("DNN") to process SMT problem representations of SMT problems and provide SMT solver configurations for at least one SMT solver;
    providing, as an input to the DNN, a first SMT problem representation of a first SMT problem;
    receiving, as an output from the DNN, an indication of a first SMT solver of the at least one SMT solver and a first SMT solver configuration for the first SMT solver;
    rearranging the first SMT solver configuration of the first SMT solver based at least in part on the output from the DNN to produce an adjusted SMT solver configuration of the first SMT solver such that processing of the first SMT problem by the first SMT solver using the adjusted SMT solver configuration will be a shorter processing time compared to other SMT solver configurations of the first SMT solver; and
    processing, with the first SMT solver having the first adjusted SMT solver configuration, the first SMT problem.

2. The computer-implemented method of claim 1, wherein the first SMT solver configuration reduces a second processing time required by the SMT solver to process the first SMT problem.

3. The computer-implemented method of claim 1, further comprising:
    providing, to a second DNN, the first SMT problem representation and an indication of the adjusted SMT solver configuration; and
    receiving, from the second DNN, a second processing time determined by the second DNN for the SMT solver, having the adjusted SMT solver configuration, to process the first SMT problem.

4. The computer-implemented method of claim 1, further comprising:
    prior to providing the first SMT problem representation to the DNN:
        providing, to a second DNN, a second SMT problem representation of the first SMT problem according to a first SMT problem configuration;
        receiving, from the second DNN, an adjusted SMT problem configuration, wherein the adjusted SMT problem configuration is different than the first SMT problem configuration of the SMT problem; and
        generating, based at least in part on the SMT problem and the adjusted SMT problem configuration, the first SMT problem representation.

5. The computer-implemented method of claim 4, wherein the adjusted SMT problem configuration is to reduce the processing time required by the SMT solver to process the first SMT problem.

6. A computing system, comprising:
    one or more processors; and
    a memory storing program instructions that, when executed by the one or more processors, causes the one or more processors to at least:
        for a first satisfiability modulo theories ("SMT") problem:
            convert the first SMT problem into a first abstract syntax tree ("AST") that includes a first plurality of nodes representative of parts of the first SMT problem;
            transform the first AST into a first graph by, at least:
                compressing the first AST through removal of at least one node from the first AST; and
                removing first confidential information included in the first AST;
            process the first graph with a graph neural network ("GNN") to generate a first SMT problem representation of the first SMT problem;
            process the first SMT problem, using a first SMT solver having a first SMT solver configuration, to determine a first processing time required by the first SMT solver having the first SMT solver configuration to process the first SMT problem; and
            generate first training data that includes at least the first SMT problem representation, an indication of the first SMT solver configuration, and the first processing time;
        train, with at least the first training data, a deep neural network ("DNN") to process SMT problem representations of SMT problems and provide SMT solver configurations for SMT solvers;
        generate, using the GNN, a second SMT problem representation of a second SMT problem;
        provide the second SMT problem representation to the DNN;
        receive, from the DNN, a second SMT solver configuration for a second SMT solver;

rearrange the second SMT solver configuration of the second SMT solver based at least in part on the second SMT solver configuration received from the DNN to produce an adjusted SMT solver configuration of the second SMT solver such that processing of the second SMT problem by the second SMT solver using the adjusted SMT solver configuration will be a shorter processing time compared to other SMT solver configurations of the second SMT solver; and process, using the second SMT solver configured according to the adjusted SMT solver configuration, the second SMT problem.

7. The computing system of claim 6, wherein the first second SMT solver, configured according to the adjusted SMT solver configuration, results in a second processing time by the second SMT solver to process the second SMT problem that is shorter than a third processing time required to process the second SMT problem according to a third SMT solver configuration of the first SMT solver.

8. The computing system of claim 6, wherein the program instructions that, when executed by the one or more processors to train, with at least the first training data, the DNN, further include program instructions that, when executed by the one or more processors, further cause the one or more processors to at least:

generate second training data for a third SMT problem, wherein the second training data includes a third SMT problem representation of the third SMT problem, a third SMT solver configuration for the first SMT solver, and a second processing time to process the third SMT problem with the first SMT solver having the third SMT solver configuration; and train, with at least the first training data and the second training data, the DNN.

9. The computing system of claim 8, wherein the program instructions that, when executed by the one or more processors to generate the second training data, further include program instructions that, when executed by the one or more processors, further cause the one or more processors to at least:

convert the third SMT problem into a second AST;
process the second AST to compress the second AST into a second graph; and
process the second graph with the GNN to generate the third SMT problem representation of the third SMT problem.

10. The computing system of claim 6, wherein the program instructions that, when executed by the one or more processors to train, with at least the first training data, the DNN, further include program instructions that, when executed by the one or more processors, further cause the one or more processors to at least:

generate second training data for a third SMT problem that includes a third SMT problem representation, a third SMT solver configuration of the second SMT solver, and a second processing time to process the third SMT problem with the second SMT solver having the third SMT solver configuration; and train, with at least the first training data and the second training data, the DNN.

11. The computing system of claim 10, wherein the program instructions that, when executed by the one or more processors, further cause the one or more processors to at least:

provide, to the DNN, a fourth SMT problem representation of a fourth SMT problem;

receive, from the DNN:
an indication of the second SMT solver, wherein the second SMT solver is different than the first SMT solver; and
a fourth SMT solver configuration for the second SMT solver;

configure the second SMT solver according to the fourth SMT solver configuration; and process, using the second SMT solver configured according to the fourth SMT solver configuration, the fourth SMT problem.

12. The computing system of claim 6, wherein the first SMT problem representation is a vector representation of the first SMT problem.

13. The computing system of claim 6, wherein the program instructions that, when executed by the one or more processors to train, with at least the first training data, the DNN, further include program instructions that, when executed by the one or more processors, further cause the one or more processors to at least:

transform a third SMT problem into a third SMT problem representation of the third SMT problem;

process the third SMT problem, using the second SMT solver having a third SMT solver configuration, to determine a second processing time required by the second SMT solver having the third SMT solver configuration to process the third SMT problem;

generate second training data that includes at least the third SMT problem representation, an indication of the third SMT solver configuration, and the second processing time; and train, with at least the first training data and the second training data, the DNN.

14. The computing system of claim 6, wherein the DNN is at least one of a graph neural network, a convolutional neural network, or a recurrent neural network.

15. A method, comprising:
for each of a plurality of satisfiability modulo theories ("SMT") problems:
converting the SMT problem into an abstract syntax tree ("AST") that includes a plurality of nodes representative of parts of the SMT problem;
transforming the AST into a graph by, at least:
compressing the AST through removal of at least one node from the AST; and
removing confidential information included in the AST;
generating, from the graph, an SMT problem representation;
generating an SMT solver configuration representation of a configuration of an SMT solver;
processing the SMT problem, using the SMT solver with the SMT solver configuration, to determine a processing time required by the SMT solver to process, with the SMT solver configuration, the SMT problem; and
generating training data that includes at least the SMT problem representation, the SMT solver representation, and the processing time;
training, with the training data, a deep neural network ("DNN");
providing, to the DNN, a first SMT problem representation;
receiving, as an output from the DNN, an indication of a first SMT solver of a plurality of SMT solvers and a first SMT solver configuration for the first SMT solver when processing the first SMT problem; and rearranging the first SMT solver configuration of the first SMT solver based at least in part on the output from the DNN to produce an adjusted SMT solver configuration of the first SMT solver such that processing of the first SMT problem by the first SMT solver using the adjusted SMT solver configuration will be a shorter processing time compared to other SMT solver configurations of the first SMT solver.

16. The method of claim 15, wherein the training data includes:
a second training data that includes the first SMT problem representation, a second SMT solver configuration representation of a second configuration of the SMT solver, and a second processing time required by the SMT solver to process, with the second SMT solver configuration, the SMT problem.

17. The method of claim 15, wherein the training data includes:
a second training data that includes the first SMT problem representation, an indication of a second SMT solver, a second SMT solver configuration representation of a second configuration of the second SMT solver, and a second processing time required by the second SMT solver to process, with the second SMT solver configuration, the SMT problem.

18. The method of claim 15, further comprising:
providing, to a second DNN, the adjusted SMT solver configuration and the first SMT problem representation; and
receiving, from the second DNN, a second processing time expected to be required to process the first SMT problem using the first SMT solver with the adjusted SMT solver configuration.

19. The method of claim 15, further comprising:
receiving, from a third party, the first SMT problem.

20. The method of claim 15, wherein the first SMT problem representation is a vector representation of the first SMT problem.

* * * * *